(12) United States Patent  
Brown et al.

(10) Patent No.: US 7,543,122 B2  
(45) Date of Patent: Jun. 2, 2009

(54) SYSTEM AND METHOD FOR OBSCURING HAND-HELD DEVICE DATA TRAFFIC INFORMATION

(75) Inventors: Michael K. Brown, Kitchener (CA); Herbert A. Little, Waterloo (CA); Michael S. Brown, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 204 days.

(21) Appl. No.: 11/202,786

(22) Filed: Aug. 11, 2005

(65) Prior Publication Data

US 2007/0038820 A1 Feb. 15, 2007

(51) Int. Cl.  
*G06F 12/00* (2006.01)

(52) U.S. Cl. .................. 711/158; 711/154; 711/165; 726/26

(58) Field of Classification Search .......... 711/158  
See application file for complete search history.

(56) References Cited

U.S. PATENT DOCUMENTS

| | | | |
|---|---|---|---|
| 6,370,620 B1 * | 4/2002 | Wu et al. | 711/132 |
| 6,467,026 B2 * | 10/2002 | Yamamoto et al. | 711/118 |
| 7,143,145 B2 * | 11/2006 | Seraphin | 709/217 |
| 7,210,134 B1 * | 4/2007 | Langer | 717/140 |
| 2003/0167408 A1 * | 9/2003 | Fitzpatrick et al. | 713/201 |
| 2004/0015644 A1 | 1/2004 | Gammel et al. | |
| 2007/0056043 A1 * | 3/2007 | Onyon et al. | 726/26 |

FOREIGN PATENT DOCUMENTS

WO   WO 9744736 A1 * 11/1997

OTHER PUBLICATIONS

"Randomize a list", 2003, VB Helper. http://web.archive.org/web/20030313225240/http://www.vb-helper.com/howto_randomize_list.html.*  
Lenny Bailes, "Playing with Playlist", PC World, Mar. 2001.*  
D. Page, "Defending against cache-based side-channel attacks", 2003, Elsevier Science Ltd.*

* cited by examiner

*Primary Examiner*—Kevin L Ellis  
*Assistant Examiner*—Kalpit Parikh  
(74) *Attorney, Agent, or Firm*—Jenna L. Wilson; Dimock Stratton LLP (57) ABSTRACT

Increasing security for a hand-held data processing device with communication functionality where such a device includes an access-ordered memory cache relating to communications carried out by the device. The hand-held data processing device has a locked state that is entered by the device receiving or initiating a trigger. On occurrence of the trigger to enter the locked state the memory cache is reordered so as to disrupt the access-ordering of the cache to obscure device traffic information and thus increase the security of the device in the locked state.

21 Claims, 3 Drawing Sheets

SYSTEM AND METHOD FOR OBSCURING HAND-HELD DEVICE DATA TRAFFIC INFORMATION

BACKGROUND

Hand-held data processing devices are frequently wireless and allow users to communicate with a variety of other devices and systems. As part of such communication functionality, hand-held data processing devices generate and store data relating to the communications which have occurred using the hand-held devices. To improve operating functionality of such devices, the storage of certain data relating to communication information may be carried out using a cache. In such an arrangement, a hand-held data processing device includes a processor which operates in conjunction with a memory cache component in the device. The storage of data relating to device communication as entries in a fast access memory cache allows for operating efficiencies in the hand-held device.

For example, a device may allow for security certificate information to be stored as an entry in a cache to allow for faster access to such certificate information as part of secure communication operations carried out by the hand-held device. It is known to operate such caches in an ordered manner, such as a "move to front" cache in which the most recently accessed entry in the cache is placed at the front of the ordered cache.

Hand-held data processing device design includes the determination of what information is to be retained in caches, for how long, and whether to retain cache data when the device enters a locked state. With respect to the last design consideration, hand-held devices may be placed in a locked state in which much of the communication and other functionality of the device is disabled. Typically, a user must enter a password on the hand-held device to continue use of the device after it has been placed in a locked state (although certain functions, such as incoming telephone call reception may be permitted). The intention of the device entering the locked state is to heighten the security of the hand-held device. Unauthorized access is intended to be prevented by the device being placed in a locked state as it is intended that only the authorized user will be able to take the device out of the locked state by entering an appropriate password.

However, it is possible for attacks to take place on the security of the hand-held device even when the device is in a locked state. An unauthorized access to the device may allow a probe to be used to access the contents of memory on the device. Another type of attack involves a malicious application ("Trojan horse" software) being loaded on the device which will covertly execute to inspect the contents of device memory and make information about the memory contents available to an unauthorized attacker. To prevent information being extracted from a locked device, it is desirable to limit the information that is retained by the data in the device's memory cache when the device is in the locked state. To completely delete the data in the memory cache on entering a locked state, however, will mean inefficiencies are introduced in the operation of the hand-held device. In such a case, it would be necessary for the various memory caches on the device to be re-built whenever the hand-held device returns from a locked state. It is therefore the case in certain hand-held devices that the cache data is retained in the memory caches during the time that the device is in a locked state.

As set out above, such retained cache day may be subject to an unauthorized attack in which the memory cache is accessed. The information stored in the data in the cache is potentially placed at risk. In addition, traffic information relating to communications carried out by the hand-held device is potentially made available to the attacker if such communication information is stored in a cache. For such a cache in which the entries are ordered based on their most recent access, such as a move to front ordering, information about the recent communications of the hand-held device user will be available from an analysis of the location of entries in the relevant cache. Based on such information, an unauthorized access to the device may allow an attacker to determine traffic patterns for the device and hence provide knowledge of common communications carried out by the user.

It would accordingly be advantageous to provide a system and method to allow communication-related data to be retained in a hand-held device cache during a locked state but which makes difficult the acquisition of traffic pattern information by an unauthorized access of the hand-held device cached memory.

BRIEF DESCRIPTION OF THE DRAWINGS

In the drawings which illustrate tan embodiment of the invention by way of example only.

DETAILED DESCRIPTION

According to an aspect of the invention there is provided an improved method for secure operation of a hand-held data processing device with communication functionality.

In accordance with an aspect of the invention there is provided a method for use in increasing the security of the communication device, the device being a hand-held data processing communication device comprising an cache memory for storing cache entries corresponding to device communication information, the cache memory being access-ordered during user operation of the communication device, the device being configured to enter a locked state, the method comprising the steps of the communication device defining a reordering sot of entries in the cache memory for reordering within the cache memory, the communication device accepting or generating a trigger to enter a locked state, responsive to the trigger to enter a locked state, the communication device redefining the ordering of the cache entries in the reordering set of cache entries, relative to the contents of the cache memory, so as to no longer be access-ordered.

In accordance with an aspect of the invention there is provided the above method in which the access-ordered cache memory is a move to front cache memory with a front portion and in which the step of defining a reordering set of entries in the cache memory further comprises the step of selecting entries for the reordering set from entries located at the front portion of the cache memory.

In accordance with an aspect of the invention there is provided the above method in which the step of redefining the ordering of the cache entries in the reordering set of cache entries comprises the steps of stepping through the entries in the reordering set to successively select each of the entries in the set, for each selected entry randomly selecting an exchange target entry in the cache memory and exchanging the selected entry in the reordering set with the exchange target entry in the cache memory.

In accordance with an aspect of the invention there is provided a program product for improving the security of a communications device, the program product comprising a computer or communications device usable medium having computer or communications device readable program product code embodied in said medium, said program code being executable by a processor of a communications device for implementing the above methods.

In accordance with an aspect of the invention there is provided in a hand-held data processing communication device comprising an cache memory and cache manager for storing cache entries corresponding to device communication information, the cache memory entries being access-ordered during user operation of the communication device, and the device being configured to enter a locked state, an improved cache manager responsive to a trigger for the device to enter a locked state, and operative to redefine the ordering of the cache entries so as to no longer be access-ordered during the locked state.

Advantages of the preferred embodiment of the invention include the storage of cache information relating to communications of a hand-held data processing device such that when the device is placed in a locked state the cached data is retained in the data cache but traffic information for the device is obscured.

Figure 1:
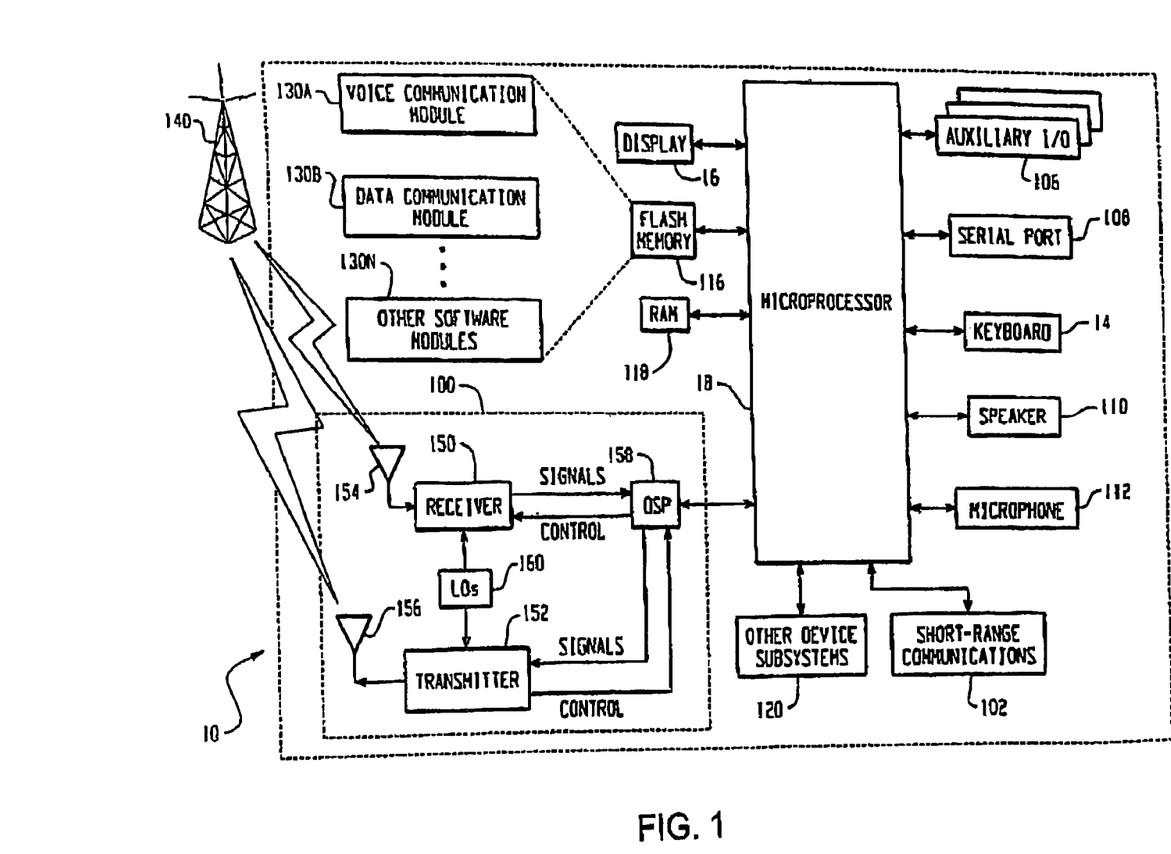
FIG. 1 is a block diagram of a system overview of a hand-held data processing devices of the preferred embodiment.

The preferred embodiment will be described in detail below, by way of example only, in the context of hand-held data processing devices 10 having wireless communications capabilities and a battery, as generally illustrated in FIG. 1. However, although the system and method is particularly advantageous in the hand-held data processing devices 10, it will be appreciated that the principles of the system apply to other hand-held data processing devices having communication functionality and the system and method described are not intended to be limited thereby. The preferred embodiment may be implemented as a data processing device program product that includes program code for operation on a microprocessor to carry out the steps in the process described. The computing-device program product may be embodied in, and delivered to an intended recipient device by, signals carried by networks, including the Internet, or may be embodied in media such as magnetic, electronic or optical storage media. The process described may be carried out by a combination of executable code and hardware embodied in a hand-held data processing device (the process being in this case a data processing device-implemented method). It is contemplated that the preferred embodiment will be implemented on wireless hand-held mobile devices in which resources such as power, memory and processing capacity are constrained by desired limits on the size and weight of the devices.

Hand-held data processing devices 10 each include a housing, a keyboard 14 and an output device 16. The output device shown in FIG. 1 is a display 16, which is preferably a full graphic LCD. Other types of output devices may alternatively be utilized. A processor 18, which is shown schematically in FIG. 1, is contained within the housing and is coupled between the keyboard 14 and (he display 16. The processor 18 controls the operation of the display 16, as well as the overall operation of the data processing device 10, in response to actuation of keys on the keyboard 14 by the user.

The housing may be elongated vertically, or may take on other sizes and shapes (including clamshell housing structures). The keyboard may include a mode selection key, or other hardware or software for switching between text entry and telephony entry. The housing contains the primary power supply, in the embodiment shown a battery 170, a secondary power supply, which may be a small rechargeable battery or capacitor capable of sustaining power to the processor 18, NAND flash 116 and SDRAM 118 for the duration of an AutoSave interval and a Power Controller 190.

In addition to the processor 18, other parts of the data processing device 10 are shown schematically in FIG. 1. These include a communications subsystem 100; a short-range communications subsystem 102; the keyboard 14 and the display 16, along with other input/output devices 106, 108, 110 and 112; as well as memory devices 116, 118 and various other device subsystems 120. The data processing device 10 is preferably a two-way RF communication device having voice and data communication capabilities. In addition, the data processing device 10 preferably has the capability to communicate with other computer systems via the Internet.

Operating system software executed by the processor 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM including also DRAM and SDRAM) 118. Communication signals received by the data processing device 10 may also be stored to the RAM 118.

The processor 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system.

Communication functions, including data and voice communications, are performed through the communication subsystem 100, and possibly through the short-range communications subsystem. The communication subsystem 100 includes a receiver 150, a transmitter 152, aid one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the data processing device 10 is intended to operate. For example, a data processing device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the data processing device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the data processing device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processor 18. The received signal is then further processed by the processor 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the data processing device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

In FIG. 1, microprocessor 18 of hand-held data processing device 10 is shown with a connection to RAM 118 and a connection to flash memory 116. As is typical in data processing devices, and is the case in the preferred embodiment, microprocessor 18 has available to it memory storage units that operate at different speeds. In the example of FIG. 1, RAM 118 is faster access memory and flash memory 116 is a slower memory unit. As will also be appreciated, microprocessors may also include memory storage units within the microprocessors themselves. Although this description of the preferred embodiment refers to memory storage units, memory components or memory storage devices, it will be understood that the physical arrangement of such memory can vary. The description of the preferred embodiment relates to a hand-held data processing device that is used for communication and which maintains a memory unit, memory device or memory component for the storage of data relating to information concerning the communication that has been carried out by the hand-held device. As is described below, for certain device designs, such information concerning the communications of the device permits communication traffic information for the device to be obtained directly or deduced.

To efficiently make use of the memory in hand-held data processing device 10 of FIG. 1, the preferred embodiment provides for memory caching. The use of a memory cache involves a fast-access portion of memory being set aside for storage of data that is identified as likely to be accessed by the processor of the hand-held device. In the example configuration shown in FIG. 1, data persistently stored in flash memory 116 may be copied into a memory cache location defined in RAM 118 for use during execution of particular software applications selected from 130A . . . 130N. The presence of such data in RAM 118 permits more efficient software operation as access to such cached data will be faster than access to data in flash memory 116, for example.

Figure 2:
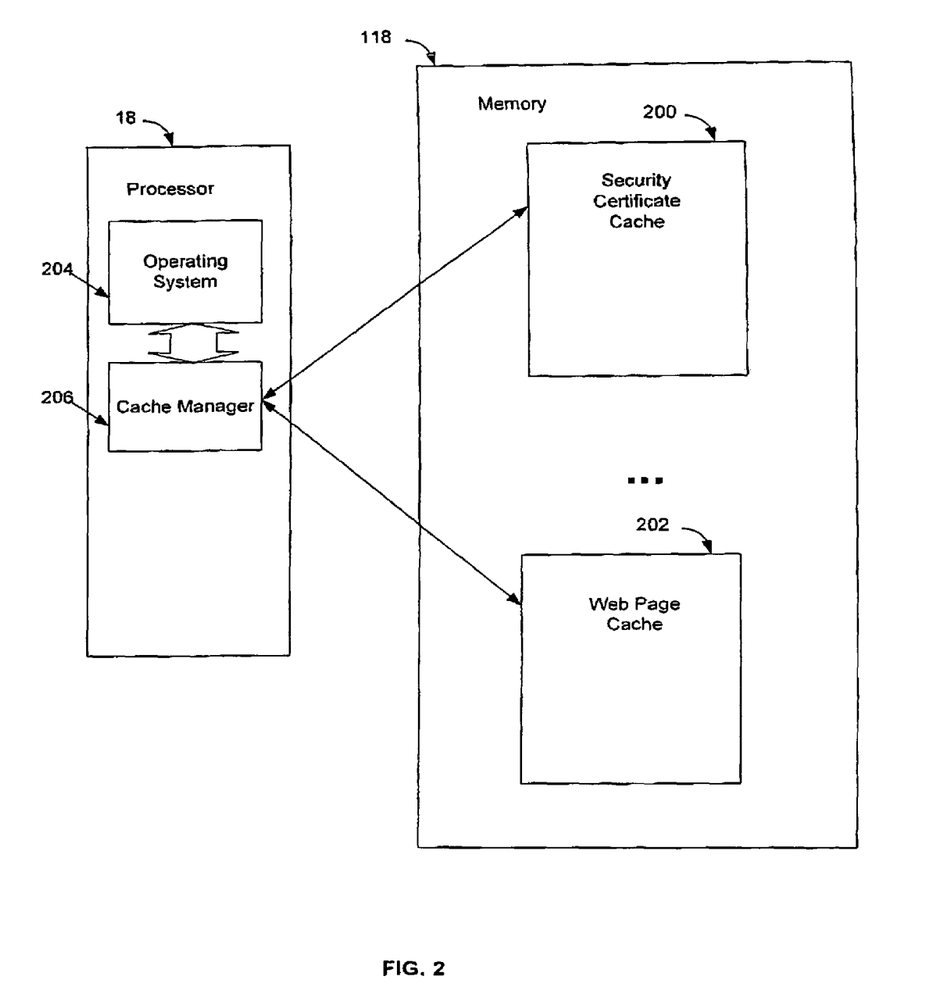
FIG. 2 is a block diagram showing a high-level abstraction of the relationship between a processor and cache memory of the preferred embodiment.

As is shown in the example block diagram of FIG. 2, in the preferred embodiment, caches are separately defined and generated for different types of data. The simple example of FIG. 2 shows processor 18 able to access RAM 118. RAM 118 includes, by way of example, security certificate cache 200 and web page cache 202. For secure communication functionality in particular, cache 200 for security certificates is desirable. Security certificates are used in secure communication between the hand-held device and other data processing devices and systems. A security certificate is typically stored (in flash memory 116, for example) in a byte-array format. However, for use in software executing on microprocessor 18, the security certificate is made available as a Java object. The conversion from byte array form to Java object form is typically a relatively complex operation and therefore it is preferable to retain the Java object form in a memory cache for future use. For this reason, the preferred embodiment includes a defined cache for security certificates.

In an alternative design for hand-held data processing device 10 a single communications-related cache may be defined to include heterogeneous cache entries. For example, such a cache may include security certificate information entries and web browser page entries.

Security certificate cache 200 is defined to include an entry in the cache corresponding to a certificate. In the preferred embodiment, the entry includes the byte array form of the certificate, a cyclic redundancy code for the byte array form, as well as the object form of the certificate. The example web page cache 202 shown in FIG. 2 has a cache entry structure that differs from the cache entry structure defined for cache 200. As will be appreciated, however, the definition of the cache entry structure will typically not be significant for the cache reordering described. For this reason, the description set out below relates to cache 200 as a representative cache defined in the examples of the figures.

In the example of FIG. 2, operating system 204 is shown executing on microprocessor 18. Further, cache manager 206 is shown also executing on processor 18 and interoperating with operating system 204. As will be appreciated, the specifics of how caches 200, 202 are managed will depend on implementation design decisions for hand-held data processing device 18. In the preferred embodiment, cache manager 206 is executable program code that is executable by microprocessor 18 and is operative to manage access to and the maintenance of caches defined in RAM 118.

Figure 3:
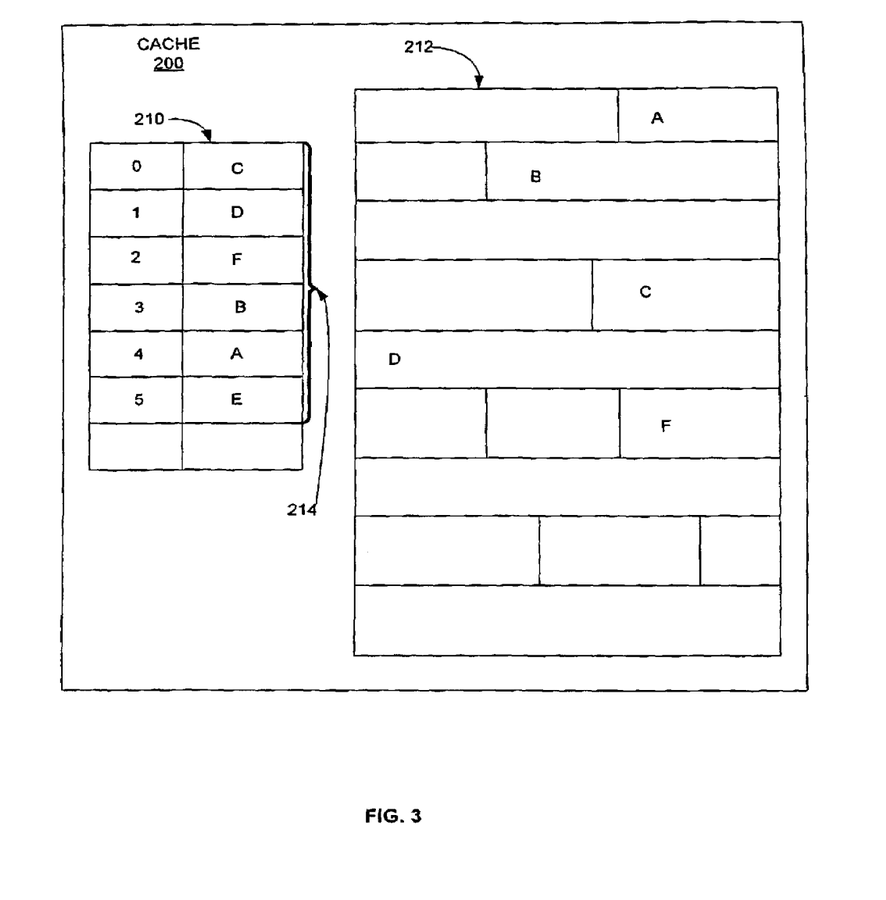
FIG. 3 is a block diagram showing a high-level abstraction of index and memory block for a cache of the preferred embodiment.

FIG. 3 is a block diagram showing, at a high level of abstraction, the format of cache 200. In the preferred embodiment, entries in the memory caches are ordered relative to a specified first entry, or front entry, of the cache. As will be appreciated by those skilled in the art, the ordering of the cache entries, and the definition of the front of the cache, may be implemented in different ways. These implementations provide for identifiable entries in the cache that are ordered, based on the most recent access to the cache entries by the microprocessor. In the preferred embodiment the ordering is relative to a front entry and to each other.

In the preferred embodiment as shown in FIG. 3, cache 200 is provided with an index 210 that defines the ordering of the entries in cache 200. Entry order is maintained by operation of cache manager 206 in a move to front arrangement in which the most recently accessed entry in cache 200 is moved to the front of cache 200. Index 210 is shown with entry 0 being the front of the cache. Cache 200 entries are shown in memory block 212 and are denoted by letters A-F. Thus in the example of FIG. 3, the front of cache 200 is defined by index entry 0 in index 210, which points to cache entry C in memory block 212. The preferred embodiment is described with respect to the move to front ordering of caches. However, the approach of the preferred embodiment is also applicable to other defined cache ordering designs where the ordering is based on the relative timing of access to the various cache entries (referred to in this description as "access-ordered"). For example, a move to back cache arrangement will potentially provide the same type of traffic information as a move to front arrangement and the reordering of the cache entries described below may be carried out on such an ordered cache, with the appropriate modifications.

When, as part of application execution, microprocessor 18 execution seeks access to another entry in the cache, cache manager 206 code executes such that the identifier for the other entry in memory block 212 (often the memory address) will be placed at index entry 0 in index 210, and the other entries in cache index 210 will be pushed down the index. In this manner, cache 200 effectively maintains a record of the most recently accessed cache entries. In the simple example of FIG. 3, therefore, cache entry D is shown as having been accessed prior to entry C, and F is shown as accessed prior to D, as is reflected by the relative locations of those entry identifiers in index 210 (at index entries 0, 1, 2, respectively). In the preferred embodiment, a similar arrangement is defined (using cache manager 206 operation) for other caches such as web page cache 202 that maintains copies of web pages accessed by hand-held data processing device 10.

The access-ordering of cache entries, such as that found in the move to front arrangement described above, provides for efficient use of the memory cache. However, knowledge of the use of such an arrangement and access to the cache contents may potentially be used by an attacker to obtain information about communication traffic on the hand-held device. As will be apparent, by access-ordering the cache entries, such as in a move to front manner, traffic pattern information will be potentially revealed by inspecting the ordering of cache entries (in the example of FIG. 3, by inspecting the ordering index 210).

In hand-held data processing device 10 of the preferred embodiment, security of operation is supported by the device entering a locked state. During such a state it is intended that many of the communication functions of the device will be unavailable. In the preferred embodiment, the device is capable of being used to answer an incoming mobile telephone call, but is otherwise unusable. The implementation of such a locked state may vary for different hand-held devices.

In the preferred embodiment, on a user attempting to access device 10 using keyboard 14 or other input devices 106 (such as a thumbwheel) during a locked state, display 16 will merely show the user a screen requiring the user to input a password. The user can unlock the device by entering the correct password on the device using keyboard 14. If the password is incorrect the device will remain in a locked state. However, after successfully exiting the locked state, the communication and other functionality of device 10 are made available to the user.

In the preferred embodiment device 10, a locked state may be entered by the user using keyboard 14 or input device 106 to choose to lock the device by selecting a lock icon displayed on display 16. Alternatively, a locked state may be entered after an inactivity timeout (as may be defined by the user or an administrator for the device). Further triggers for entering a locked state include: device 10 being physically returned to a cradle or holster; expiry of a defined amount of time since the previous locked state exit (independent of the activity or inactivity of the device); and receipt of a command by device 10 from an administrator to force the device 10 to lock. As suggested by this list of potential triggers, device 10 of the preferred embodiment is designed to often be placed in a locked state in typical use. As device 10 is a mobile, wireless hand-held unit that potentially stores confidential communication and other information, the use of a locked state is part of the device operation intended to maintain the security of the device.

Because the locked state is entered and exited frequently in typical use of the hand-held device of the preferred embodiment, entries in caches such as cache 200 are retained in device 10 during the locked state. Efficiency of operation of device 10 is increased if the cached data remains available for use by processor 18 on exit from a locked state.

Although placing hand-held data processing device 10 in a locked state will provide a sufficient level of security in most cases, attacks on the data of the device may be made using probes, Trojan horse applications, or other techniques developed to determine the content of memory in device 10, despite the fast that the device is in a locked state. As indicated above, without other steps being taken, the use of an ordered arrangement of the cache elements in cache 200 will potentially provide traffic information to an attacker who is able to obtain unauthorized access to the memory contents of device 10 during a locked state.

In the preferred embodiment, however, such traffic information is obscured by the software cache manager software 206 executable by microprocessor 18 upon device 10 entering into a locked state. According to the preferred embodiment, when a trigger for the device to enter a locked state occurs, the ordering of entries in cache 200 is altered so that during the locked state, cache 200 no longer has a move to front ordering. In this way, the entries in cache 200 are retained to allow for continued efficient access to such data, but traffic information, that could otherwise be obtained by inspecting the move to front ordering of the cache, is obscured.

FIG. 2 shows cache manager 206 interoperating with operating system 204. In the preferred embodiment, operating system 204 will communicate the request to enter a locked state to cache manager 206 (amongst other executing applications and utilities). Cache manager 206 includes code executable by microprocessor 18 and operative to carry out the reordering of the communication-related memory caches, as described below. An alternative architecture (not shown) provides a different cache manager for each of caches 200, 202 so as to provide cache management functions related to the characteristics of the different types of caches used in device 10.

In the preferred embodiment example of FIG. 3, a reordering set 214 of entries in cache 200 is defined. The index arrangement of cache 200 results in this definition of the set of cache entries being carried out with reference to index entries. In other cache implementations, such a set of cache entries may be defined in other ways. For example, where a cache is defined without an index and the (move to front) ordering of the cache is accomplished by a rearrangement of memory within the block of cache entries itself, the definition of reordering set 214 will be made with respect to the entries in the block of entries directly.

In the preferred embodiment, the set of cache entries include entries located at the front portion of the cache. For appropriate cache sizes, such as that shown in FIG. 3, set 214 may be defined to be equal to the cache size itself (in such a case the step of defining reordering set 214 may become trivial or may be found implicitly in the reordering step). In other cases, set 214 may be a subset of the cache. The set of cache entries 214 is defined such that the members of set 214 will be reordered and therefore, in the move to front arrangement of cache 200 in the preferred embodiment, those entries in the reordering set 214 include entries at the front portion of the cache. As will be appreciated, as reordering set 214 becomes larger and comes close to the size of cache 200, the traffic information obtainable by inspecting the contents of cache 200 becomes increasingly more obscured after reordering. In the example of FIG. 3, all six entries in cache 200 are included in reordering set 214, as reordering set 214 is defined to include index entries 0 . . . 5. For other move to front caches, the definition of the front portion of the cache will vary, depending on the size of the cache and the communication patterns of the device. Where for a particular communication mode there are limited communication-related cache entries likely to be generated in typical device use, the size of the front portion of the cache for such communications may be relatively small, and conversely where the number of entries is anticipated to be large.

Where the cache is access-ordered (based on relative access times for the cache entries) but is not a move to front arrangement, reordering set 214 is defined to include that portion of the ordered cache whose entries includes data reflecting the aspect of the device traffic that is intended to be kept most secure. Typically, this will be the cache entries most recently accessed. However, it may be that in some cases the least recently accessed cache entries will be of interest to a potential attacker and reordering set 214 can therefore be defined to include the cache entries that have remained unaccessed for the longest time. As will be apparent, where constraints of the performance of device 10 permit reordering set 214 to be defined to be the size of the entire cache whereby, all entries may be subject to reordering.

As referred to above, it may also be possible for hand-held data processing device 10 to include a cache capable of storing heterogeneous entries. In such a case, reordering set 214 may also be defined such one or more types of entries are included in the set while other types of entries are not (ie. entries are selected based on pre-defined entry attributes). For example, security certificate entries might be defined to be potential members of reordering set 214 while telephone number entries may be considered not to be of security significance and to therefore be excluded from reordering set 214.

In preferred embodiment, the step of reordering the cache entries in reordering set 214 is carried out by stepping through the entries in reordering set 214 to successively select each entry in the set. For each selected entry, the reordering includes the step of randomly selecting an exchange target entry in the cache and then exchanging the selected entry in the reordering set with the target entry in the cache. In this manner, a random reordering of the entries in reordering set 214 in cache 200 is accomplished. As will be appreciated, other reordering techniques may be used (such as sorting the entries according to a selected hashing function). Such techniques will result in the cache entries being reordered such that the previously defined access-order of the cache entries is disrupted so that previously available traffic information is obscured.

As will be appreciated, other methods of carrying out such a reordering are possible. For example, where the cache size is large relative to the reordering set, it may be possible to interleave the reordering set entries within the larger set of cache entries without disturbing the ordering of the reordering set entries relative to each other. Such a reordering will, for certain cache structures, effectively destroy the relationship between the position of entries in the ordered cache with the recent communication activity of the device. These techniques are defined such that when device 10 enters a locked state, following such a reordering, the ordering of entries in cache 200 as a whole is no longer an access-ordering and information about device traffic, such as the most recent communication carried out on the device, is thus obscured.

As will be apparent, communication-related traffic information stored in different caches may be handled in the same manner. For example, device 10 may include caches for telephone numbers, web pages (as in cache 202), or calendar items updated using the device communication functions. Traffic information concerning all such cache entries may be sensitive and it is potentially desirable to maintain such cache entries in their respective caches during a locked state while obscuring the traffic information that could otherwise be gleaned from the ordering of such caches. In such cases, the approach described above may be used so as to obscure such traffic information.

An embodiment having been thus described in detail by way of example, it will be apparent to those skilled in the art that variations and modifications may be made without departing from the invention.

We claim:

1. A method for increasing the security of a communication device, the device being a hand-held data processing communication device comprising a cache memory for storing cache entries corresponding to device communication information, the cache memory being access-ordered during user operation of the communication device, the device being configured to enter a locked state, the method comprising the steps of:
   (a) the communication device defining a reordering set of entries in the cache memory for reordering within the cache memory,
   (b) the communication device accepting or generating a trigger to enter the locked state, and
   (c) responsive to the trigger to enter the locked state, the communication device redefining the ordering of the cache entries in the reordering set of cache entries, relative to the contents of the cache memory, so as to no longer be access-ordered.

2. The method of claim 1 in which the access-ordered cache memory is a move to front cache memory with a front portion and in which the step of defining a reordering set of entries in the cache memory further comprises the step of selecting entries for the reordering set from entries located at the front portion of the cache memory.

3. The method of claim 1 in which the step of redefining the ordering of the cache entries in the reordering set of cache entries comprises the steps of stepping through the entries in the reordering set to successively select each of the entries in the set, for each selected entry:
  randomly selecting an exchange target entry in the cache memory; and
  exchanging the selected entry in the reordering set with the exchange target entry in the cache memory.

4. The method of claim 3 in which the entries in the cache memory comprise data representing security certificate information.

5. The method of claim 3 in which the entries in the cache memory comprise data representing web pages recently browsed using the communication device.

6. The method of claim 1 in which the reordering set of entries is defined to comprise cache entries having one or more of a set of predefined attributes.

7. A computer program product for improving the security of a communications device, the program product comprising a computer or communications de ice usable magnetic electronic, or optical medium having computer or communications device readable program product code embodied in said medium, said program code being executable by a processor of a communications device for implementing the method of any one of claims 1 to 6.

8. The method of claim 1, wherein the trigger is selected from one or more of: an inactivity timeout, placing the hand-held data processing communication device in a cradle or holster, expiry of a defined amount of time since a previous exit from the locked state, and receipt of a command to enter the locked state.

9. A hand-held data processing communication device comprising a cache memory and a cache manager for storing cache entries corresponding to device communication information, the cache entries being access-ordered during user operation of the communication device, and the device being configured to enter a locked state, the device comprising an improved cache manager responsive to a trigger for the device to enter the locked state, and operative to redefine the ordering of the cache entries so as to no longer be access-ordered when the device is in the locked state.

10. A data processing system or network comprising at least one hand-held data processing communication device according to claim 9.

11. The hand-held data processing communication device of claim 9, wherein the cache memory comprises a move to front cache memory having a front portion.

12. The hand-held data processing communication device of claim 11, wherein the improved cache manager is operative to redefine the ordering of the cache entries by:
  defining a reordering set of entries in the cache memory; and
  selecting entries for the reordering set from entries located at the front portion of the cache memory.

13. The hand-held data processing communication device of claim 12, wherein the improved cache manager is operative to redefine the ordering of cache entries by:
  successively selecting each of the entries in the reordering set, and for each selected entry.
    randomly selecting an exchange target entry in the cache memory; and
    exchanging the selected entry in the reordering set with the exchange target entry in the cache memory.

14. The hand-held data processing communication device of claim 13, wherein the cache entries comprise data representing security certificate information.

15. The hand-held data processing communication device of claim 13, wherein the cache entries comprise data representing web pages recently browsed using the device.

16. The hand-held data processing communication device of claim 12, wherein the reordering set of entries is defined to comprise cache entries having one or more of a set of predefined attributes.

17. The hand-held data processing communication device of claim 16, wherein the set of predefined attributes comprises most recently-accessed cache entries, least-recently accessed cache entries, and cache entries comprising device traffic data intended to be kept most secure.

18. The hand-held data processing communication device of claim 12, wherein the reordering set of entries is a subset of the cache entries in the cache memory.

19. The hand-held data processing communication device of claim 9, wherein the improved cache manager is operative to redefine the ordering of the cache entries by:
  defining a reordering set of entries in the cache memory, wherein the reordering set of entries is a subset of the ca the entries in the cache memory; and
  interleaving the entries of the reordering set of entries within the cache entries in the cache memory.

20. The hand-held data processing communication device of claim 9, comprising:
  a second cache memory for storing a second set of cache memory entries corresponding to device communication information, the second set of cache memory entries being access-ordered during user operation of the communication device; and
  a second cache manager corresponding to the second cache memory responsive to the trigger for the device to enter the locked state, wherein the second cache manager is operative to redefine the ordering of the second set of cache memory entries so as to no longer be access-ordered when the device is in the locked state.

21. The method of claim 6, wherein the set of predefined attributes comprises most recently-accessed cache entries, least-recently accessed cache entries, and cache entries comprising device traffic data intended to be kept most secure.

* * * * *

UNITED STATES PATENT AND TRADEMARK OFFICE
CERTIFICATE OF CORRECTION

| | |
|---|---|
| PATENT NO. | : 7,543,122 B2 |
| APPLICATION NO. | : 11/202786 |
| DATED | : June 2, 2009 |
| INVENTOR(S) | : Michael K. Brown, Herbert A. Little and Michael S. Brown |

Page 1 of 1

It is certified that error appears in the above-identified patent and that said Letters Patent is hereby corrected as shown below:

Column 11, line 24, delete "de ice" and insert therefor --device--;

Column 12, line 3, delete "procssing" and insert therefor --processing--;
Column 12, line 7, after "entry", delete "." and insert therefor --,--;
Column 12, lines 34 and 35, delete "cathe" and insert therefor --cache--.

Signed and Sealed this

Thirtieth Day of June, 2009

JOHN DOLL
*Acting Director of the United States Patent and Trademark Office*